(12) United States Patent
O'Connor et al.

(10) Patent No.: US 7,283,213 B2
(45) Date of Patent: Oct. 16, 2007

(54) METHOD AND SYSTEM TO CORRECT MOTION BLUR AND REDUCE SIGNAL TRANSIENTS IN TIME-OF-FLIGHT SENSOR SYSTEMS

(75) Inventors: Patrick O'Connor, Sunnyvale, CA (US); Ilhami Torunoglu, Monte Sereno, CA (US); Rajeev Nagabhirana, Santa Clara, CA (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

(21) Appl. No.: 11/350,222

(22) Filed: Feb. 8, 2006

(65) Prior Publication Data
US 2006/0176469 A1 Aug. 10, 2006

Related U.S. Application Data

(60) Provisional application No. 60/650,920, filed on Feb. 8, 2005.

(51) Int. Cl.
*G01C 3/08* (2006.01)
(52) U.S. Cl. .................... 356/5.11; 356/5.1; 356/5.01
(58) Field of Classification Search ............. 356/5.11
See application file for complete search history.

(56) References Cited

U.S. PATENT DOCUMENTS 5,483,336 A * 1/1996 Tocher ..................... 356/3.15
2005/0099504 A1* 5/2005 Nayar et al. ............. 348/222.1

* cited by examiner

*Primary Examiner*—Thomas H. Tarcza
*Assistant Examiner*—Luke D. Ratcliffe
(74) *Attorney, Agent, or Firm*—Michael A. Kaufman

(57) ABSTRACT

TOF system shutter time needed to acquire image data in a time-of-flight (TOF) system that acquires consecutive images is reduced, thus decreasing the time in which relative motion can occur. In one embodiment, pixel detectors are clocked with multi-phase signals and integration of the four signals occurs simultaneously to yield four phase measurements from four pixel detectors within a single shutter time unit. In another embodiment, phase measurement time is reduced by a factor (1/k) by providing super pixels whose collection region is increased by a factor "k" relative to a normal pixel detector. Each super pixel is coupled to k storage units and four-phase sequential signals. Alternatively, each pixel detector can have k collector regions, k storage units, and share common clock circuitry that generates four-phase signals. Various embodiments can reduce the mal-effects of clock signal transients upon signals, and can be dynamically reconfigured as required.

29 Claims, 7 Drawing Sheets

METHOD AND SYSTEM TO CORRECT MOTION BLUR AND REDUCE SIGNAL TRANSIENTS IN TIME-OF-FLIGHT SENSOR SYSTEMS

RELATION TO PENDING APPLICATIONS

Priority is claimed to U.S. provisional patent application Ser. No. 60/650,920 filed 8 Feb. 2005, entitled "A Method for Removing the Motion Blur of Time of Flight Sensors".

FIELD OF THE INVENTION

The invention relates generally to camera or range sensor systems including time-of-flight (TOF) sensor systems, and more particularly to correcting errors in measured TOF distance (motion blur) resulting from relative motion between the system sensor and the target object or scene being imaged by the system. The invention also relates to simplifying implementation of TOF sensor systems and circuits to reduce signal transients such that improved electrical accuracy (or signal integrity) of power, ground, reference, bias, or signal nodes results.

BACKGROUND OF THE INVENTION

Electronic camera and range sensor systems that provide a measure of distance from the system to a target object are known in the art. Many such systems approximate the range to the target object based upon luminosity or brightness information obtained from the target object. However such systems may erroneously yield the same measurement information for a distant target object that happens to have a shiny surface and is thus highly reflective, as for a target object that is closer to the system but has a dull surface that is less reflective.

A more accurate distance measuring system is a so-called time-of-flight (TOF) system. FIG. 1 depicts an exemplary TOF system, as described in U.S. Pat. No. 6,323,942 entitled CMOS-Compatible Three-Dimensional Image Sensor IC (2001), which patent is incorporated herein by reference as further background material. TOF system 100 can be implemented on a single IC 110, without moving parts and with relatively few off-chip components. System 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 also includes a microprocessor or microcontroller unit 160, memory 170 (which preferably includes random access memory or RAM and read-only memory or ROM), a high speed distributable clock 180, and various signal conversion, computing and input/output (I/O) circuitry 190. Among other functions, controller unit 160 may perform distance to object and object velocity calculations.

Under control of microprocessor 160, a source of optical energy 120 is periodically energized and emits optical energy via lens 125 toward an object target 20. Typically the optical energy is light, for example emitted by a laser diode or LED device 120. Some of the emitted optical energy will be reflected off the surface of target object 20, and will pass through an aperture field stop and lens, collectively 135, and will fall upon two-dimensional array 130 of pixel detectors 140 where an image is formed. In so-called time-of-flight (TOF) implementations, each imaging pixel detector 140 in a two-dimensional sensor array 130 can capture the time required for optical energy transmitted by emitter 120 to reach target object 20 and be reflected back for detection. The TOF system can use this TOF information, to determine distances z.

Emitted optical energy traversing to more distant surface regions of target object 20 before being reflected back toward system 100 will define a longer time-of-flight than optical energy falling upon and being reflected from a nearer surface portion of the target object (or a closer target object). For example the time-of-flight for optical energy to traverse the roundtrip path noted at t1 is given by $t1=2 \cdot Z1/C$, where C is velocity of light. A TOF sensor system can acquire three-dimensional images of a target object in real time. Such systems advantageously can simultaneously acquire both luminosity data (e.g., signal amplitude) and true TOF distance measurements of a target object or scene.

As described in U.S. Pat. No. 6,323,942, in one embodiment of system 100 each pixel detector 140 has an associated high speed counter that accumulates clock pulses in a number directly proportional to TOF for a system-emitted pulse to reflect from an object point and be detected by a pixel detector focused upon that point. The TOF data provides a direct digital measure of distance from the particular pixel to a point on the object reflecting the emitted pulse of optical energy. In a second embodiment, in lieu of high speed clock circuits, each pixel detector 140 is provided with a charge accumulator and an electronic shutter. The shutters are opened when a pulse of optical energy is emitted, and closed thereafter such that each pixel detector accumulates charge as a function of return photon energy falling upon the associated pixel detector. The amount of accumulated charge provides a direct measure of round-trip TOF. In either embodiment, TOF data permits reconstruction of the three-dimensional topography of the light-reflecting surface of the object being imaged.

Some systems determine TOF by examining relative phase shift between the transmitted light signals and signals reflected from the target object. U.S. Pat. No. 6,515,740 (2003) and U.S. Pat. No. 6,580,496 (2003) disclose respectively Methods and Systems for CMOS-Compatible Three-Dimensional Imaging Sensing Using Quantum Efficiency Modulation. FIG. 2A depicts an exemplary phase-shift detection system 100' according to U.S. Pat. Nos. 6,515,740 and 6,580,296. Unless otherwise stated, reference numerals in FIG. 2A may be understood to refer to elements identical to what has been described with respect to the TOF system of FIG. 1

In FIG. 2A, an exciter 115 drives emitter 120 with a preferably low power (e.g., perhaps 250 mW to perhaps 10 W peak) periodic waveform, producing optical energy emissions of known frequency (perhaps a hundred MHz) for a time period known as the shutter time (perhaps 10 ms). Energy from emitter 120 and detected signals within pixel detectors 140 are synchronous to each other such that phase difference and thus distance Z can be measured for each pixel detector. Detection of the reflected light signals over multiple locations in pixel array 130 results in measurement signals referred to as depth images.

The optical energy detected by the two-dimensional imaging sensor array 130 will include amplitude or intensity information, denoted as "A", as well as phase shift information, denoted as $\phi$. As depicted in exemplary waveforms in FIGS. 2B, 2C, 2D, the phase shift information varies with distance Z and can be processed to yield Z data. For each pulse or burst of optical energy transmitted by emitter 120, a three-dimensional image of the visible portion of target object 20 is acquired, from which intensity and Z data is obtained (DATA'). As described in U.S. Pat. Nos. 6,515,740 and 6,580,496, obtaining depth information Z requires acquiring at least two samples of the target object (or scene) 20 with 90° phase shift between emitted optical energy and the pixel detected signals. While two samples is a minimum, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data. Further details as to implementation of various embodiments of phase shift systems may be found in U.S. Pat. Nos. 6,515,740 and 6,580,496.

Many factors, including ambient light, can affect reliability of data acquired by TOF systems. As a result, in some TOF systems the transmitted optical energy may be emitted multiple times using different systems settings to increase reliability of the acquired TOF measurements. For example, the initial phase of the emitted optical energy might be varied to cope with various ambient and reflectivity conditions. The amplitude of the emitted energy might be varied to increase system dynamic range. The exposure duration of the emitted optical energy may be varied to increase dynamic range of the system. Further, frequency of modulation of the emitted optical energy may be varied to improve the unambiguous range of the system measurements.

In practice, TOF systems may combine multiple measurements to arrive at a final depth image. But if there is relative motion between system 100 and target object 20 while the measurements are being made, the TOF data and final depth image can be degraded by so-called motion blur. By relative motion it is meant that while acquiring TOF measurements, system 100 may move, and/or target object 20 may move, or the scene in question may include motion. For example, if shutter time is 10 ms, relative motion occurring faster than about ¹⁄₄₀ ms (for a four-sample acquisition) will produce motion blur. The undesired result is that the motion blur will cause erroneous distance Z data, and will yield a depth image with errors.

Furthermore, implementing such a TOF sensor system requires that each pixel in the pixel array receive a periodic clock signal from a clock generator. The clock signals must be distributed to each pixel in the array, typically via routing wires or leads on IC 110. In practice, the clock circuitry and interconnect route wiring can influence other portions of the sensor system, for example, causing current or voltage fluctuations on power, ground, reference, bias, or signal nodes in the system. These undesired fluctuations translate into depth measurement errors or 'noise' in the result and are referred to as signal integrity problems.

What is needed in TOF measurements is a method and system to detect and compensate for motion blur, preferably with reduced signal integrity problems.

The present invention provides such a method and system.

SUMMARY OF THE PRESENT INVENTION

The present invention provides a method and system to diminish time required to acquire motion blur from final depth images acquired using TOF systems, by decreasing the elapsed depth images. As long as relative motion does not occur at a rate faster than can be compensated for, motion blur will be substantially reduced or eliminated by the present invention. Further, the present invention can reduce problems associated with signal integrity in power, ground, reference, bias, and signal nodes in TOF system applications.

In one embodiment, pixel detectors in the pixel array are clocked with multi-phase signals such that four phase measurements are obtained from four pixel detectors within a single shutter time unit. A collection region of each pixel detector responds to detected optical energy, and detection charge is generated. The detection charge is stored or integrated in a memory region associated with the pixel detector when the clock phase signal to the pixel detector is in an active state (e.g., logical "1" or "0", depending upon the specific implementation). In these embodiments, adjacent pixel detectors are driven with clock signals that are about 90° or about 180° apart in phase. Integration of the four signals occurs simultaneously, thus reducing the time in which motion blur can occur. As used herein, the expression "about 90°" or "about 180°" is understood to mean 90° or 180° or a phase-shifted version of either, with a tolerance of about ±1%. Thus, a 90° phase shift in reality may not necessarily be 90.000° but may in practice be about 89° to about 91°.

In another embodiment, a super pixel structure is implemented in the pixel detector array. In one implementation, a super pixel structure has a collection region "k" times larger than that in a normal pixel detector, where k is an integer >1. In this embodiment, there are k discrete storage units per super pixel. Four-phase signals are sequentially provided to the super pixel. Phase measurements can occur in (1/k) the amount of time required for a conventional unit pixel detector, thus reducing the time in which motion blur can occur. In another implementation, each pixel detector has "k" collector regions, "k" storage units, and shares a common clock circuit that receives one-phase clock signal and generates four-phase signals to the pixel detectors. In this embodiment, phase measurements occur in (1/k) the time required for a normal pixel detector, thus reducing the time in which motion blur can occur.

Additional benefits arise from providing clocks of different phases simultaneously to different detectors in pixels, or groups of pixels. The advantage of the invention is to reduce the charge being transferred or current being drawn by circuits connected to the clock signals at any given time, thus reducing undesired voltage or current fluctuations on power, ground, reference, bias or signal nodes in the TOF system. This in turn reduces signal integrity problems in the resulting TOF system.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 3A:
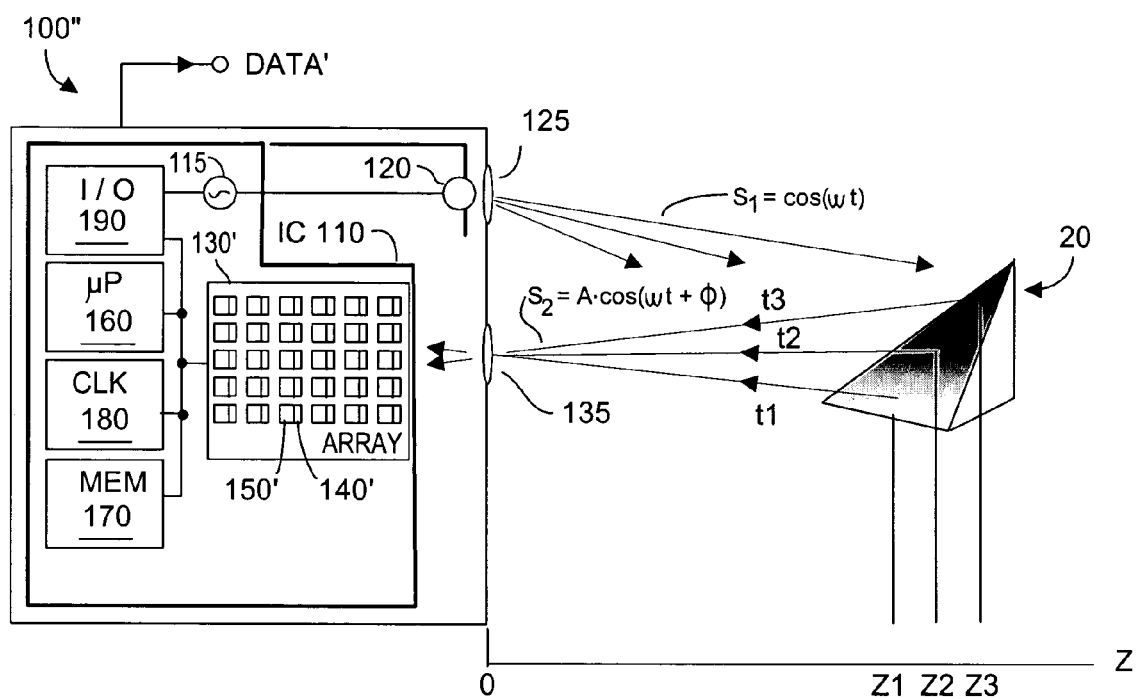
FIG. 3A is a block diagram depicting a time-of-flight three-dimensional imaging system with improved motion blur performance, according to the present invention.

FIG. 3A depicts a system 100" with improved de-blurring performance according to the present invention. Unless otherwise stated, reference numerals in FIG. 3A may be understood to refer to elements identical to what has been described with respect to other figures herein. It is thus understood that the various embodiments described below may be fabricated using CMOS technology upon a common integrated circuit substrate.

Figure 1:
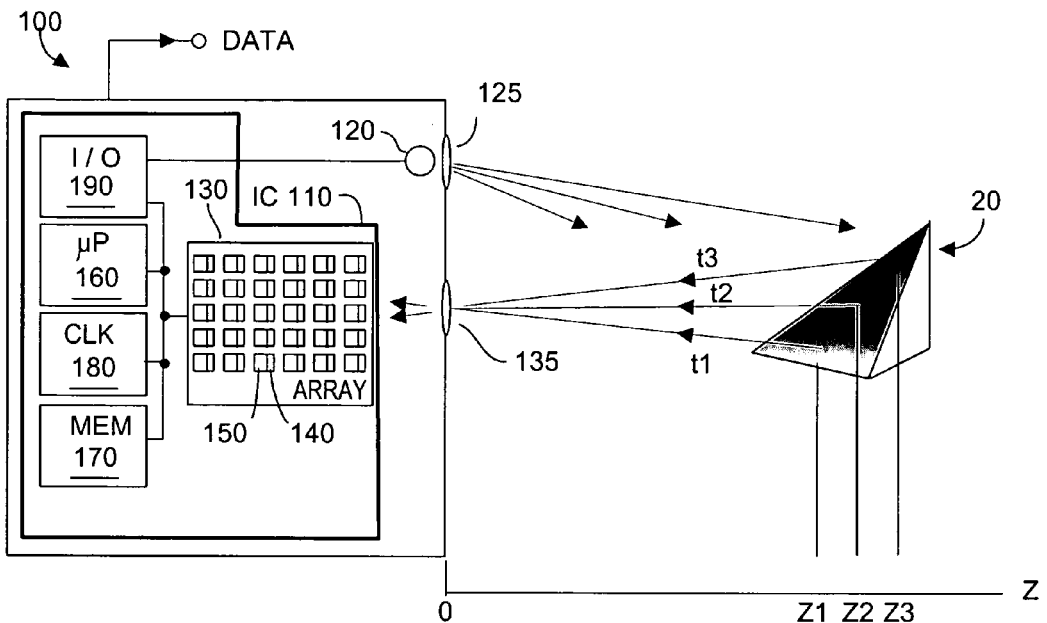
FIG. 1 is a block diagram depicting a time-of-flight three-dimensional imaging system as exemplified by U.S. Pat. No. 6,323,942, according to the prior art.
Figure 2A:
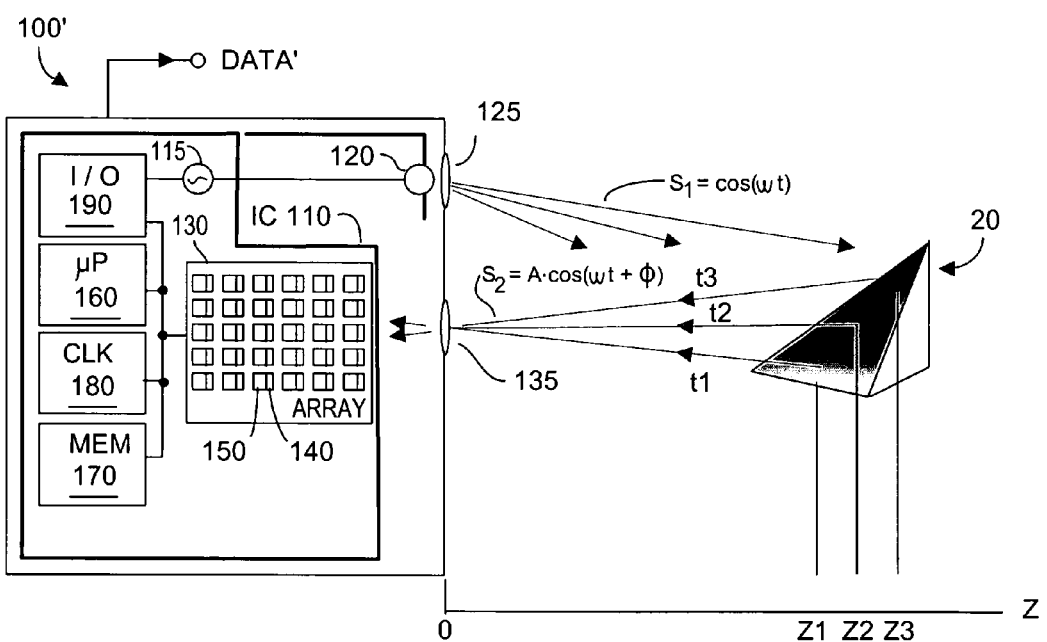
FIG. 2A is a block diagram depicting a phase-shift three-dimensional imaging system as exemplified by U.S. Pat. Nos. 6,515,740 and 6,580,496, according to the prior art.
Figure 2B:
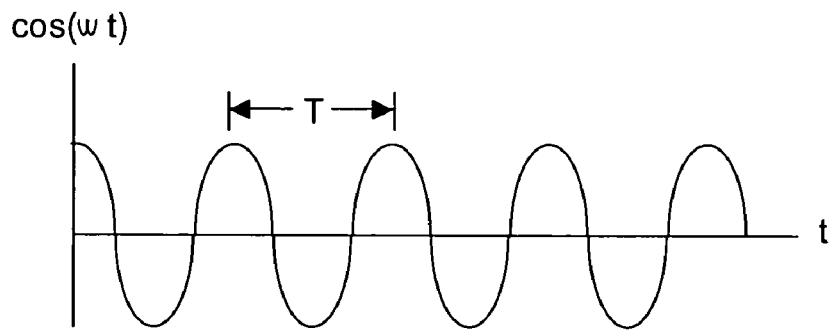
FIGS. 2B, 2C, 2D depict exemplary waveform relationships for the block diagram of FIG. 2A, according to the prior art.
Figure 2C:
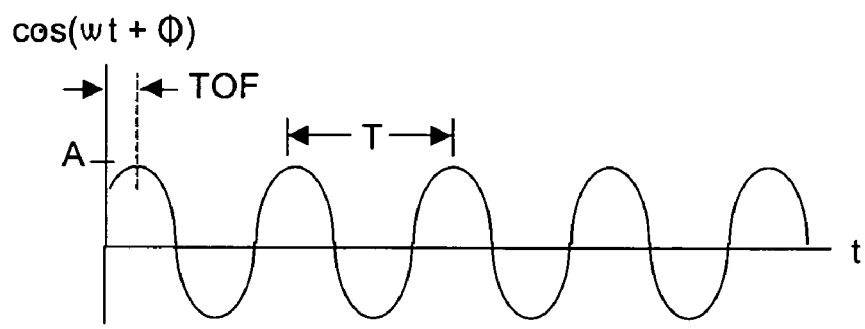
Figure 2D:
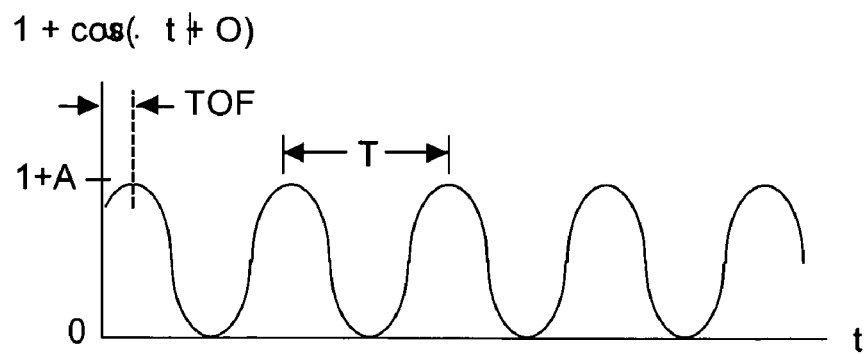

In FIG. 3A, pixel detector array 130' in system 100" differs from prior art arrays 130 in FIGS. 1 and 2A by including structures that reduce time over which TOF data is collected, thus reducing motion blur according to the present invention. As a result, output DATA' will be substantially free of motion blur, providing relative motion between system 100' and target object or scene 20 is not excessively rapid.

As noted, it usually is advantageous to obtain multiple data measurements using a TOF system 100'. Thus, microprocessor 160 may program via input/output system 190 optical energy emitter 120 to emit energy at different initial phases, for example to make system 100' more robust and more invariant to reflectivity of objects in scene 20, or to ambient light level effects in the scene. If desired, the length (exposure) and/or frequency of the emitter optical energy can also be programmed and varied. Each one of the acquired data measurements produces a depth image of the scene. However the acquired scene images may have substantially different brightness levels since the exposure and/or the initial phase of the emitted optical energy can directly affect the acquired intensity levels.

In practice, each of the detected images may take tens of milliseconds to acquire. This is a sufficiently long time period during which motion could occur in the scene 20 being imaged and/or movement of system 100' relative to the scene. When there is motion in the scene, it is likely that each of these images contains measurements from objects with different depths. As a result, a depth data value obtained by system 100' from the combination of these images could easily be erroneous, and would affect quality of the resultant final depth image. However detection array 130' advantageously reduces time in which TOF is acquired, thus producing final depth images that are substantially free of motion blur.

Figure 3B:
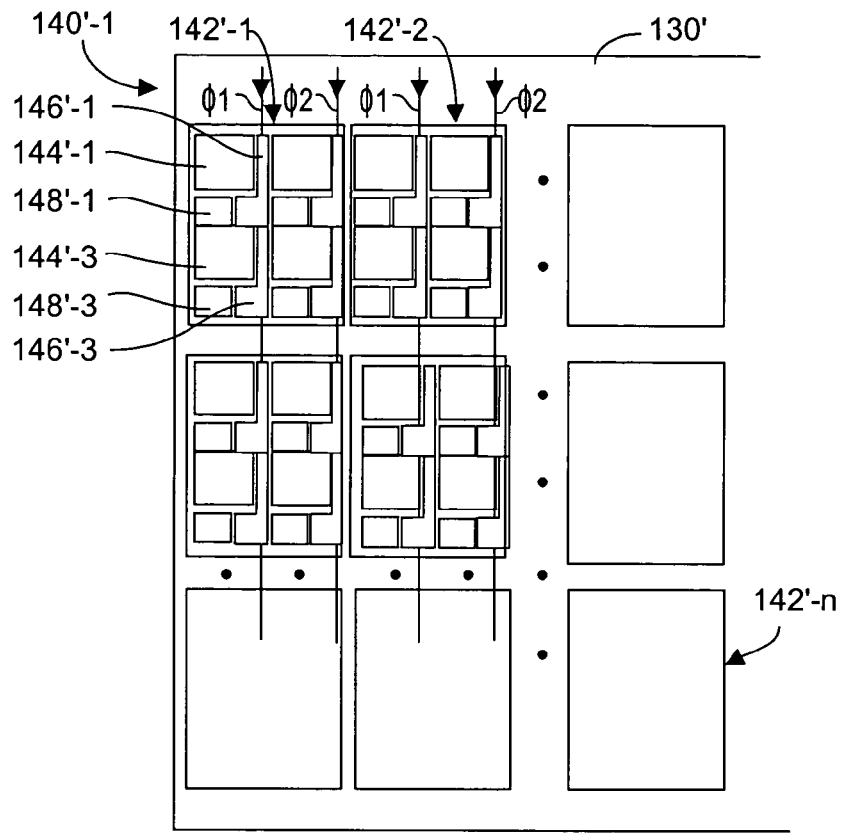
FIG. 3B is a block diagram showing an array of 2×2 pixel detectors useable with the system of FIG. 3A, according to an embodiment of the present invention.
Figure 3C:
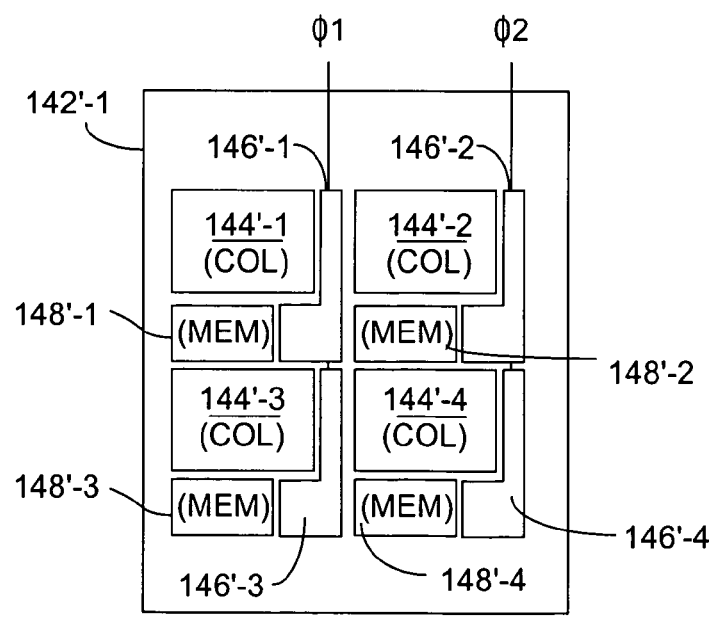
FIG. 3C is a block diagram showing further details of the pixel detector array of FIG. 3B, according to an embodiment of the present invention.

FIG. 3B depicts a portion of a 2×2 array of pixel detectors 130', while FIG. 3C depicts details of pixel detector array 130'. By 2×2 array it is meant that blocks 142' are defined to include four pixel detectors 140' that comprise collector regions 144' onto which incoming optical energy to be detected falls. Each pixel detector 140' also includes clock inverting circuitry 146', and associated dedicated memory 148'. Phase inverting circuitry 146'-n provides the proper one of $\phi1$, $\phi2$, $\phi3$, $\phi4$ to each pixel detector 140' within a block 142', where $\phi2$ is derived from $\phi1$, and where $\phi4$ is derived from $\phi3$ in this exemplary embodiment. Phase tolerance of ±1° is still achievable in a typical implementation. Adjacent pixel detectors are driven by phase clock signals that are about 90° or about 180° apart. Each pixel detector memory 148'-n temporarily stores the detector result of an acquisition from a single shutter time until I/O unit 190 converts and sends the result to processor unit 160 when it is scheduled to read and process that detector result.

The embodiment of FIGS. 3A-3C reduce motion blur in the output DATA' using blocks of preferably four identical pixel detectors that acquire four phases of detection information during a single shutter time. In this embodiment, it suffices to couple two phases of clock signal $\phi1$, $\phi2$ separated by about 90° into a block 142', with associated circuitry 146'-n generating the proper four phase signals for the individual pixel detectors within the block. Input clock signals ($\phi1$, $\phi2$) may be generated by clock circuitry 180. Exemplary clock rates for the phase signals in this embodiment are perhaps 10 MHz to about 100 MHz. In this implementation, integration of the detection signals output by each pixel detector 140'-n occurs simultaneously, which reduces by a factor of four the time within which motion blur may occur. As a result output DATA' will have reduced motion blur. It is understood that the embodiment of FIGS. 3A-3C could be implemented using two rather than four clock phases, but the resultant output DATA' could include errors that are advantageously reduced when four phase information is obtained and processed. In this embodiment, clock generator circuitry 146 buffers the input clock and couples it to detector 144. Further, circuitry 146 provides approximately 180° phase shift, and couples the thus inverted clock signal to the adjacent clock generator circuit 146 in the same column. Other implementations may route clocks in different directions, perhaps row-wise rather than column-wise, while achieving a similar net result.

Figure 3D:
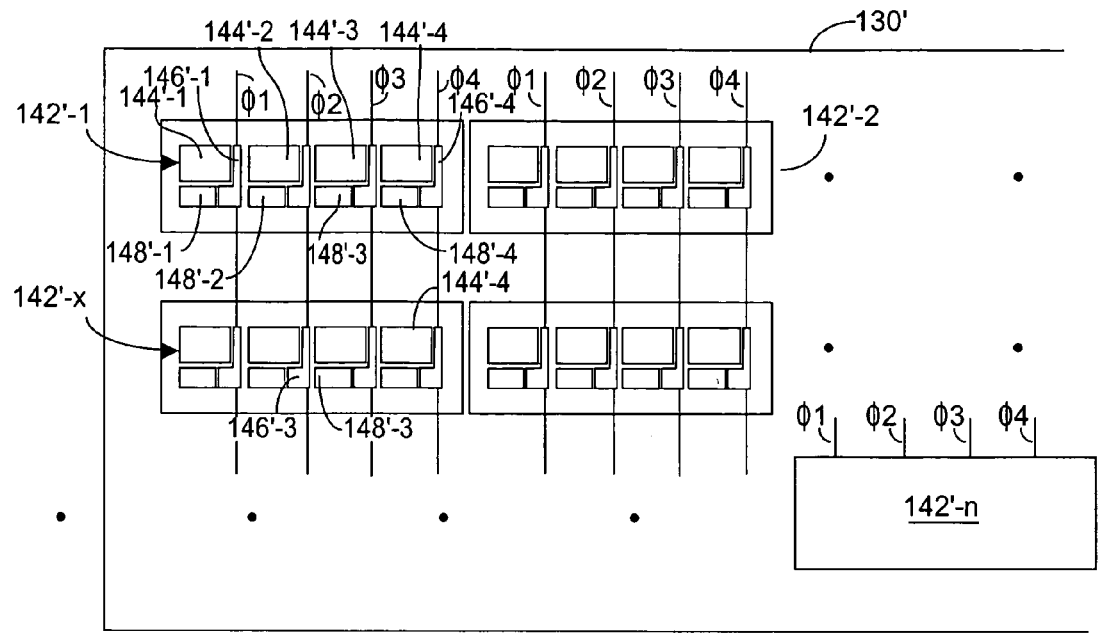
FIG. 3D is a block diagram showing an array of 1×4 pixel detectors, according to an embodiment of the present invention.
Figure 3E:
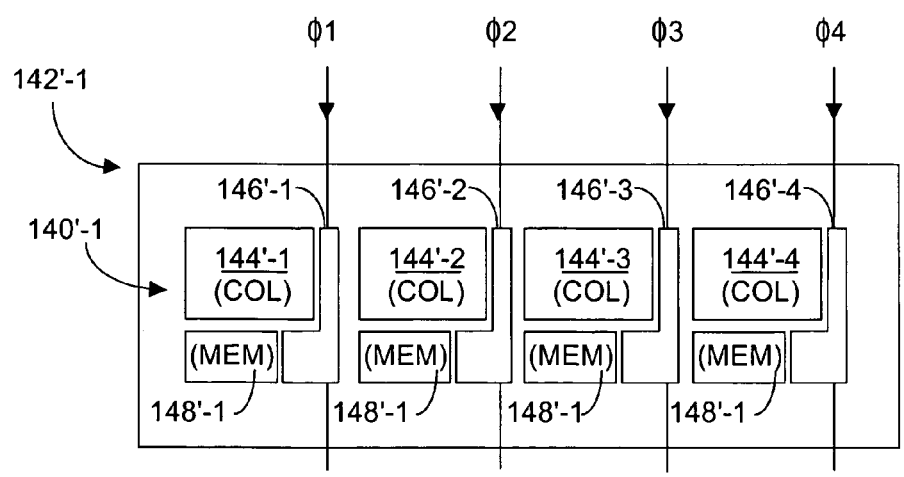
FIG. 3E is a block diagram showing further details of the pixel detector array of FIG. 3D, according to an embodiment of the present invention.

FIGS. 3D and 3E depict an alternate embodiment in which pixel detectors 140'-n are arranged in an array of 1×4 blocks 142' of pixel detectors comprising collection areas 144', phase clock inverting circuitry 146', and memory 148'. Unless otherwise noted, referenced elements in FIGS. 3D or 3E may be understood to be identical to referenced elements in FIG. 3A-3C. It is understood from FIGS. 3D and 3E that array 130' comprises a replication of multiple 1×4 blocks 142'. In this embodiment, adjacent pixel detectors are again driven by phase clock signals that are about 90° or about 180° apart. As all four phase clock signals $\phi1$, $\phi2$, $\phi3$, $\phi4$ are simultaneously presented to the pixel detectors 140' in each block 142', data representing four clock cycles are obtained in one-fourth the time, e.g., during a single shutter time. As noted, this advantageously reduced motion blur that occurs sufficiently slowly. Other configurations could of course be used, for example, a 4×1 configuration. Selecting a configuration in array 130 typically takes into account several factors. Exemplary such factors include aspect ratio of the field of view in one dimension or the other, signal routing convenience, and the problems and risks associated with differing configurations affecting signal integrity in the resultant system implementation.

The embodiments of FIGS. 3A-3E used blocks of identical pixel detectors arrayed such that adjacent pixel detectors are driven by phase clock signals that are about 90° or about 180° apart from each other. Motion blur was reduced by reducing by a factor of k=4 the shutter time needed to acquire four phases worth of data. As noted, motion blur could instead be reduced by a factor of k=2 by acquiring two rather than four phases worth of data in a shutter time interval, however system errors may be present in the data so acquired. Tradeoffs could be made as to which acquisition mode best suits an application by providing system clocks that are programmable by processor unit 160. This implementation would permit phase to be set dynamically during system operation based upon the application needs. For example, an application may acquire sufficiently accurate readings using conventional prior art four-acquisition times in a first mode, but then dynamically reconfigure to a second mode to acquire data according to the present invention when motion blur must be minimized. In another embodiment, read data could be processed simultaneously using both a conventional four-acquisitions mode and a mode according to the present invention. This configuration would advantageously enable a system to make both data views available to provide highly beneficial results both in terms of data accuracy and reduced motion blur.

Figure 4A:
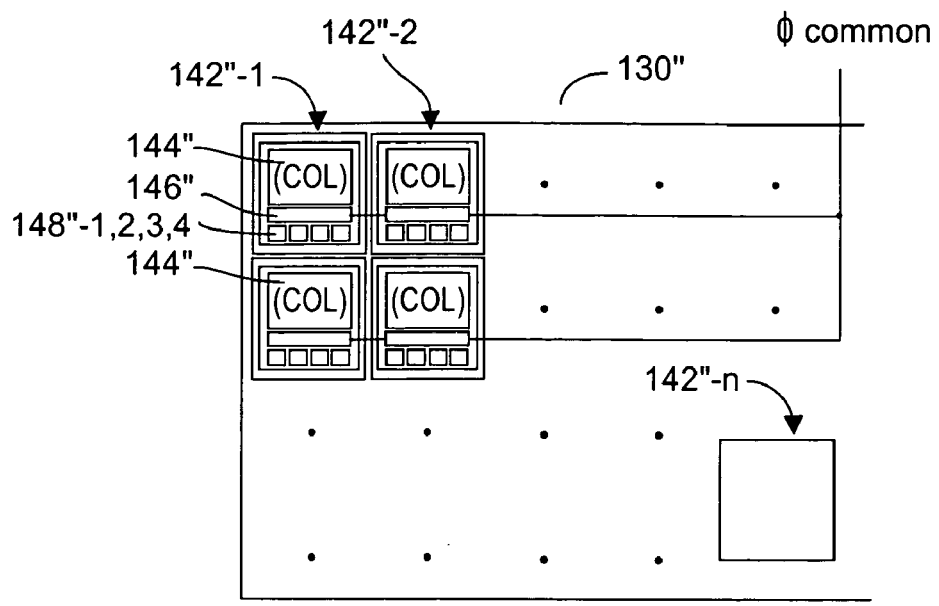
FIG. 4A is a block diagram showing an array of super pixel detectors useable with the system of FIG. 3A, according to an embodiment of the present invention.
Figure 4B:
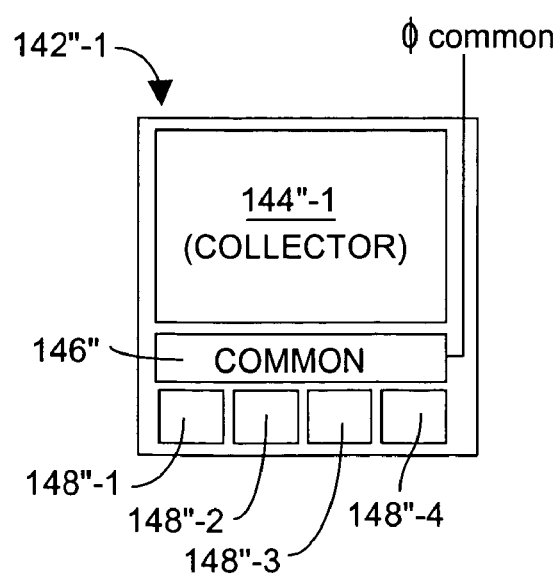
FIG. 4B is a block diagram showing further details of the pixel detector array of FIG. 4A, according to an embodiment of the present invention.

The embodiments of FIGS. 4A-4D also reduce motion blur by acquiring data in 1/k the amount of time required by prior art configurations. In the configurations of FIGS. 4A and 4B, a so-called super pixel structure is employed in which the effective collection area is k times the collection area of prior art configurations, and indeed n times the collection area of the embodiments of FIGS. 3A-3D. Understandably increasing the effective collection area by a factor of k=4 will permit collecting four times the detected charge per unit time, thus improving potential pixel performance.

FIG. 4A depicts an array 130" of super pixel detectors 142"-$n$ useable with system 100' (see FIG. 3A). As best seen in the detailed view of FIG. 4B, the collector region 144" of each super pixel detector 142" is n-times larger in collection area than the collection area of a prior art pixel detector, or indeed n-times larger than the collection area of the pixel detectors shown in FIGS. 3A-3E. An exemplary range of areas for collector region 144" in FIG. 4A is about 100 μm$^2$ to about 10,000 μm$^2$. As such, in a given shutter time period, n-times more collection charge can be collected than in a prior art pixel detector, or a given amount of detection charge is collectable in 1/n the time required for a prior art detection pixel. Each super pixel detector 142" further includes common clock circuitry 146" that receives a single common clock signal, perhaps φ1 although φ2 or φ3 or φ4 could be used instead. Further each super pixel detector 142" includes four memory regions 148"-1, 148"-2, 148"-3, 148"-1, which memory could be part of memory 170. In practice, circuitry 146" operates to obtain one phase measurement from common region 144" that is stored in one of the associated memory locations, e.g., 148"-1.

Next common circuitry 146" phase-shifts the common phase clock signal by about 90° and a second phase measurement is obtained from common region 144" and stored in another of the memory regions, e.g., memory 148"-2. Common circuitry 146" causes another measurement to be taken at a further approximately 90° phase shift and stored in memory (e.g., memory 148"-3), and finally a fourth measurement is taken at a further approximately 90° phase shift and stored in memory, e.g., memory 148"-4. Functionally the pixel detectors may be formed in a two-dimensional array as shown in FIG. 4A. It will be appreciated that the embodiment of FIGS. 4A and 4B obtains and processes four measurements of collected phase measurement data from a super pixel detector using a single common phase clock signal. As noted, the four-fold increase in surface area of collector region 144" allows four phases worth of collection data to be acquired in one-fourth the clock or shutter time needed for prior art configurations. As a result, motion blur is reduced in the output DATA". Memories 148-1 through 148-4 may subsequently be read sequentially from I/O unit 190 for data processing by digital processor 160. Alternatively, some signal processing may be done locally in common circuitry 146", with partially or perhaps fully processed results read by digital processor 160.

Figure 4C:
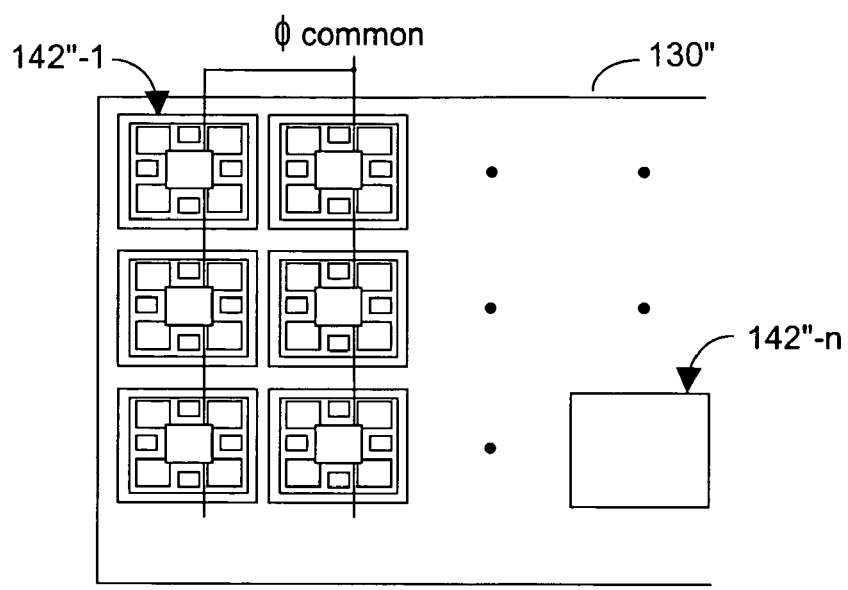
FIG. 4C is a block diagram showing an array of super pixel detectors useable with the system of FIG. 3A, according to another embodiment of the present invention.
Figure 4D:
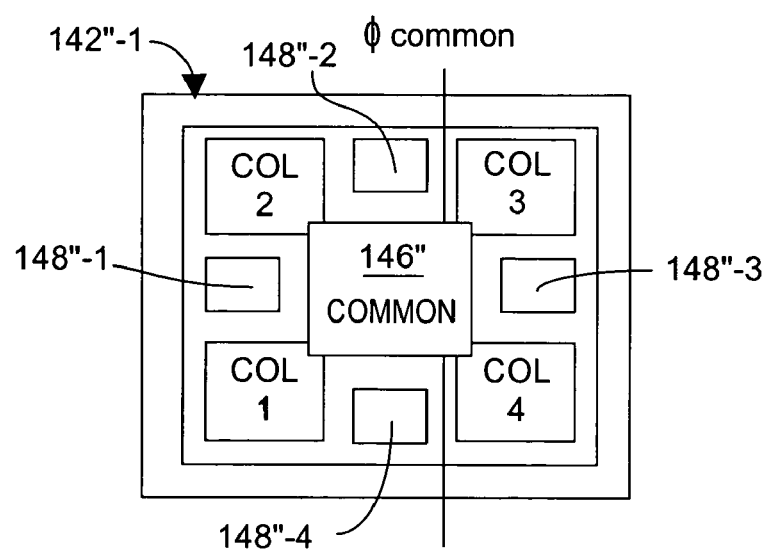
FIG. 4D is a block diagram showing further details of the pixel detector array of FIG. 4C, according to the present invention.

FIGS. 4C and 4D depict another embodiment in which a super pixel 140" has four collector regions 144"-1, 144"-2, 144"-3, 144"-1, four associated memory regions 148"-1, 148"-2, 148"-3, 148"-4, and common phase clock circuitry 146" coupled to a single clock phase, e.g., one of φ1, φ2, φ3, φ4. Clock circuitry 146" receives the one-phase input signal and causes four clock phases to be present locally such that detection charge collection from the four collector regions occurs within a single shutter period. Super pixels 140"-$n$ may be organized into a two-dimensional array 130" as exemplified by FIG. 4D. Again the presence of n=4 collection regions per super pixel and the local generation of the four clock phases φ1, φ2, φ3, φ4 permits array 130" to collect detection charge in 1/n the amount of time required by a prior art detection configuration, e.g., the required shutter time is reduced by a factor of four. The result is that motion blur is advantageously reduced.

It can be further advantageous to simultaneously provide different clock phases to different pixels or groups of pixels within the array. Signal transients induced in power supply, ground, reference, bias, or signal nodes are generated when clock signals switch between logical '1' and logical '0' levels. Reducing the number of pixels switching simultaneously at the logical transition of a given clock phase will reduce aggregate electric current or charge transfer occurring at power supply, ground, reference, bias, or signal nodes. The result is a reduction in undesired signal transients. Clock phases φ1, φ2, φ3, φ4 may be chosen to reduce undesired transients alone and/or to reduce motion blur in the measurement. Reducing undesired signal transients in power supply, ground, reference, bias, or signal nodes reduces problems associated with signal integrity.

Modifications and variations may be made to the disclosed embodiments without departing from the subject and spirit of the invention as defined by the following claims.

What is claimed is:

1. In a time-of-flight (TOF) system that emits at least first and second periodic signals of optical energy spaced apart in phase by at least about 90° and that determines distance Z to a target object by detecting and examining relative phase shift in optical energy signals reflected from the target object, a detection system comprising:

an array of blocks of four pixel detectors, each pixel detector comprising an optical energy collection area, an associated logic circuit, and an associated storage region to store collected charge detected by said pixel detector; and a phase clock unit outputting to each of said blocks at least two clock phase signals spaced-apart by at least about 90°;

each said logic circuit coupled to receive one of said clock phase signals and delaying as required the received clock phase signal such that adjacent pixel detectors receive a clock phase signal shifted about 90° from adjacent pixel detectors;

each said storage region receiving accumulated detection-generated charge when the associated pixel detector receives an active state clock phase signal.

2. The detection system of claim 1, wherein said system is configured to improve at least one of (a) motion blur measurement error due to relative motion between said detection system and said target object relative to a TOF system that requires more phase clock cycles for detection, and (b) signal integrity error resulting from phase clock switching transients.

3. The detection system of claim 1, wherein said blocks comprise two rows and two columns of said pixel detectors.

4. The detection system of claim 1, wherein at least two logic circuits are phase inverters.

5. The detection system of claim 1, wherein said phase clock unit outputs to each of said blocks four clock phase signals spaced-apart by at least about 90°.

6. The detection system of claim 1, wherein said blocks comprise a configuration selected from a group consisting of (a) one row and four columns of said pixel detectors, and (b) one column and four rows of said pixel detectors.

7. The detection system of claim 1, wherein said array and said phase clock unit are fabricated on a single CMOS compatible integrated circuit.

8. The detection system of claim 1, wherein said detection system is dynamically operable so as to simultaneously obtain and provide time interleaved and phase interleaved detection data.

9. The detection system of claim 1, wherein said detection system is dynamically operable so as to sequentially obtain and provide at least one of time interleaved and phase interleaved detection data, which data is sequentially providable to said TOF system as required by said TOF system.

10. For use with a time-of-flight (TOF) system that emits at least first and second periodic signals of optical energy spaced apart in phase by at least about 90° and that determines distance Z to a target object by detecting and examining relative phase shift in optical energy signals reflected from the target object, a method to reduce motion blur resulting from relative motion between said TOF system and said target object, the method comprising the following steps:

(a) providing an array of blocks of four pixel detectors, each pixel detector comprising an optical energy collection area, an associated logic circuit, and an associated storage region to store collected charge detected by said pixel detector; and (b) providing a phase clock unit outputting to each of said blocks at least two clock phase signals spaced-apart by at least about 90°;

each said logic circuit coupled to receive one of said clock phase signals and delaying as required the received clock phase signal such that adjacent pixel detectors receive a clock phase signal shifted 90° from adjacent pixel detectors;

each said storage region receiving accumulated detection-generated charge when the associated pixel detector receives an active state clock phase signal.

11. The method of claim 10, wherein said method results in said TOF system improving at least one of (a) motion blur measurement error due to relative motion between said TOF system and said target object relative to a TOF system that requires more phase clock cycles for detection, and (b) signal integrity error resulting from phase clock switching transients.

12. The method of claim 10, wherein step (a) includes at least one step selected from a group consisting of (i) providing said blocks in an array comprising two rows and two columns of said pixel detectors, (ii) providing said blocks in an array comprising one row and four columns of said pixel detectors, and (iii) operating at least two logic circuits as phase inverters.

13. The method of claim 10, wherein said phase clock unit outputs to each of said blocks four clock phase signals spaced-apart by at least about 90°.

14. The method of claim 10, further including fabricating said array and said phase clock unit on a single CMOS compatible integrated circuit.

15. The method of claim 10, further including dynamically configuring at least one of said array of blocks and said phase clock unit such that said TOF system is dynamically operable in at least one mode selected from a group consisting of (i) operating so as to simultaneously obtain and provide time interleaved and phase interleaved detection data, and (ii) operating so as to sequentially obtain and provide at least one of time interleaved and phase interleaved detection data, which data is sequentially providable to said TOF system as required by said TOF system.

16. In a time-of-flight (TOF) system that emits at least first and second periodic signals of optical energy spaced apart in phase by at least about 90° and that determines distance Z to a target object by detecting and examining relative phase shift in optical energy signals reflected from the target object, a detection system comprising:

an array of pixel detectors, each pixel detector comprising an optical energy collection area larger than a conventional pixel detector collection area by a factor of about four, an associated logic circuit, and four associated storage regions to store collected charge detected by said pixel detector; and a phase clock unit outputting to each said pixel detector a common clock phase signal from which said associated logic circuit generates four clock phase signals spaced-apart from each other by at least about 90°;

each said storage region receiving accumulated detection-generated charge when one of said four clock phase signals is in an active state.

17. The detection system of claim 16, wherein said system is configured to improve at least one of (a) motion blur measurement error due to relative motion between said detection system and said target object relative to a TOF system whose pixel detector collection area is smaller than said optical energy collection area, and (b) signal integrity error resulting from phase clock switching transients.

18. The detector system of claim 16, wherein said detector system is dynamically configurable and operable in at least one mode selected from a group consisting of (i) operating so as to simultaneously obtain and provide time interleaved and phase interleaved detection data, and (ii) operating so as to sequentially obtain and provide at least one of time interleaved and phase interleaved detection data, which data is sequentially providable to said TOF system as required by said TOF system.

19. The detection system of claim 16, wherein a shutter time comprising four adjacent clock phase signals is about 10 ms, and wherein said optical energy collection area is in a range of about 100 μm² to about 10,000 μm².

20. For use with a time-of-flight (TOF) system that emits at least first and second periodic signals of optical energy spaced apart in phase by at least about 90° and that determines distance Z to a target object by detecting and examining relative phase shift in optical energy signals reflected from the target object, a method to reduce at least one of motion blur resulting from relative motion between said TOF system and said target object, and phase clock switching transients, the method comprising the following steps:
   (a) providing an array of pixel detectors, each pixel detector comprising an optical energy collection area larger than a conventional pixel detector collection area by a factor of about four, an associated logic circuit, and four associated storage regions to store collected charge detected by said pixel detector; and
   (b) outputting to each pixel detector a common clock phase signal from which said associated logic circuit generates four clock phase signals spaced-apart from each other by at least about 90°;
   each of said storage region receiving accumulated detection-generated charge when one of said four clock phase signals is in an active state.

21. The method of claim 20, wherein motion blur measurement error due to relative motion between said detection system and said target object is reduced relative to a TOF system whose pixel detector collection area is smaller than said optical energy collection area.

22. The method of claim 20, further including dynamically configuring at least one of said array of pixel detectors and said phase clock signal such that said detection system is dynamically operable in at least one mode selected from a group consisting of (i) operating so as to simultaneously obtain and provide time interleaved and phase interleaved detection data, and (ii) operating so as to sequentially obtain and provide at least one of time interleaved and phase interleaved detection data, which data is sequentially providable to said TOF system as required by said TOF system.

23. The method of claim 20, wherein a shutter time comprising four adjacent clock phase signals is about 10 ms, and wherein said optical energy collection area is in a range of about 100 μm² to about 10,000 μm².

24. In a time-of-flight (TOF) system that emits at least first and second periodic signals of optical energy spaced apart in phase by at least about 90° and that determines distance Z to a target object by detecting and examining relative phase shift in optical energy signals reflected from the target object, a detection system comprising:
   an array of pixel detectors, each pixel detector comprising four optical energy collection areas, four storage regions, each of said regions associated with one of said four optical energy collection areas to store collected charge detected by said pixel detector, and a common logic circuit coupled to receive from said TOF system a single clock phase signal and to generate therefrom and couple to said pixel detectors four clock signals phase-shifted from each other by about 90°;
   each said storage region receiving accumulated detection-generated charge when an associated collection area of said pixel detector receives an active state clock phase signal;
   wherein relative to a TOF system that requires more phase clock cycles for detection, said detection system reduces at least one of (a) motion blur measurement error due to relative motion between said detection system and said target object, and (b) signal integrity error resulting from phase clock switching transients.

25. The detection system of claim 24, wherein said detection system is dynamically operable in at least one mode selected from a group consisting of (i) operating so as to simultaneously obtain and provide time interleaved and phase interleaved detection data, and (ii) operating so as to sequentially obtain and provide at least one of time interleaved and phase interleaved detection data, which data is sequentially providable to said TOF system as required by said TOF system.

26. The detection system of claim 24, wherein a shutter time comprising a sequence of four adjacent clock signals phase-shifted from each other by about 90° is about 10 ms.

27. For use with a time-of-flight (TOF) system that emits at least first and second periodic signals of optical energy spaced apart in phase by at least about 90° and that determines distance Z to a target object by detecting and examining relative phase shift in optical energy signals reflected from the target object, a method to reduce at least one of motion blur resulting from relative motion between said TOF system and said target object, and clock signal transients, the method comprising the following steps:
   (a) providing a detection system comprising an array of blocks of four pixel detectors, each pixel detector comprising four optical energy collection areas, four storage regions, each of said regions associated with one of said four optical energy collection area to store collected charge detected by said pixel detector, and a common logic circuit coupled to receive from said TOF system a single clock phase signal and to generate therefrom and couple to said pixel detectors four clock signals phase-shifted from each other by about 90°; and
   (b) providing said single clock phase signal from said TOF system;
   each of said storage regions receiving accumulated detection-generated charge when an associated collection area of said pixel detector receives an active state clock phase signal;
   wherein relative to a TOF system that requires more phase clock cycles for detection said method reduces at least one of motion blur measurement error due to relative motion between said detection system and said target object, and signal integrity error resulting from clock switching transients.

28. The method of claim 27, further including dynamically configuring at least one of said array of blocks and said phase clock signal such that said detection system is dynamically operable in at least one mode selected from a group consisting of (i) operating so as to simultaneously obtain and provide time interleaved and phase interleaved detection data, and (ii) operating so as to sequentially obtain and provide at least one of time interleaved and phase interleaved detection data, which data is sequentially providable to said TOF system as required by said TOF system.

29. The method of claim 27, wherein a shutter time comprising a sequence of four adjacent clock signals phase-shifted from each other by about 90° is about 10 ms.

* * * * *